Figure 1:
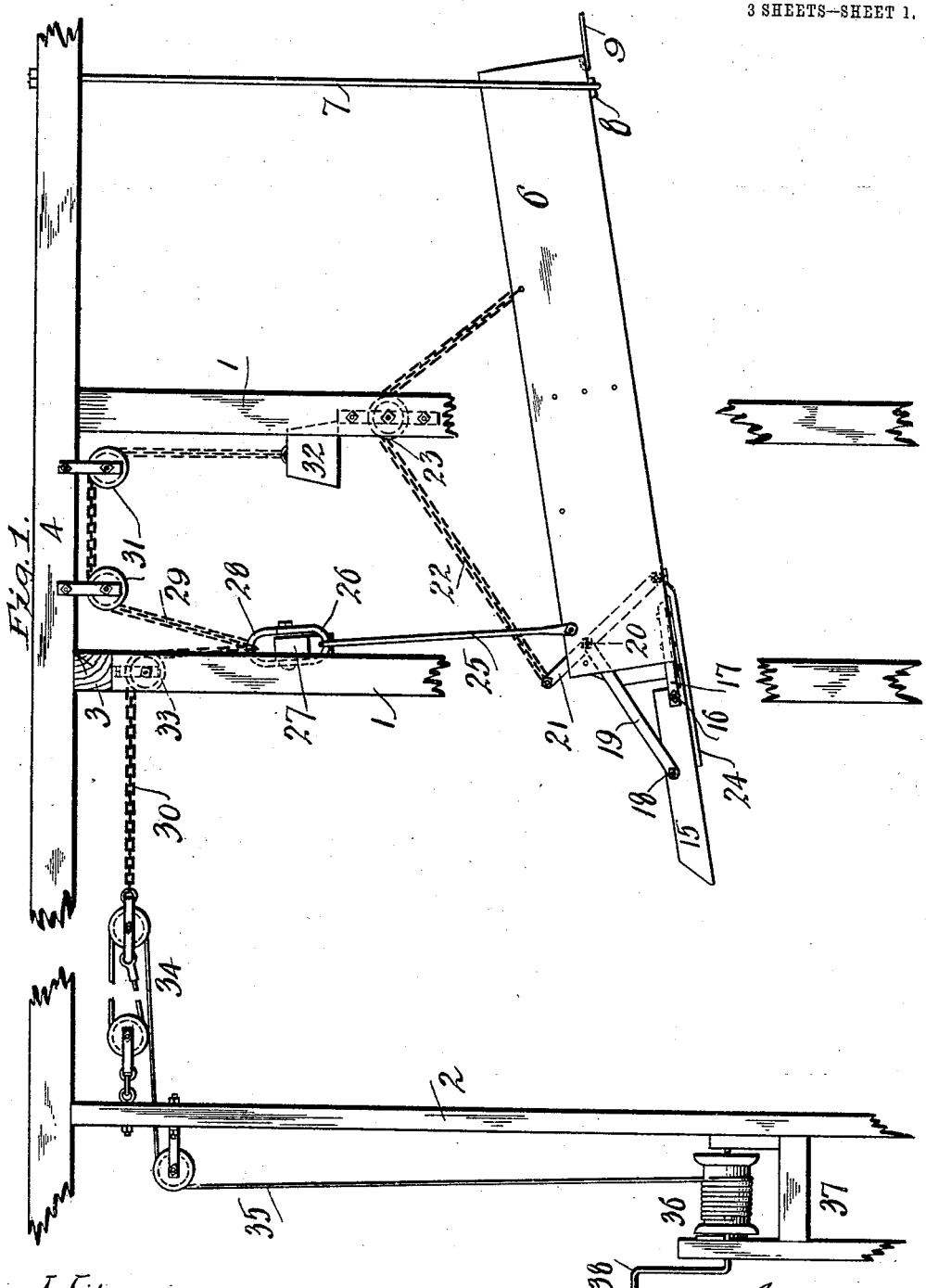

T. NEWSAM, Jr.
CAR LOADING DEVICE.
APPLICATION FILED DEC. 17, 1906.

898,594.

Patented Sept. 15, 1908.
3 SHEETS—SHEET 1.

Witnesses
H. V. Gibson
Miles C. Fuller

Inventor
Thomas Newsam Jr
By Chas. H. LaPonte Atty.

T. NEWSAM, Jr.
CAR LOADING DEVICE.
APPLICATION FILED DEC. 17, 1906.
898,594.
Patented Sept. 15, 1908.
3 SHEETS—SHEET 2.
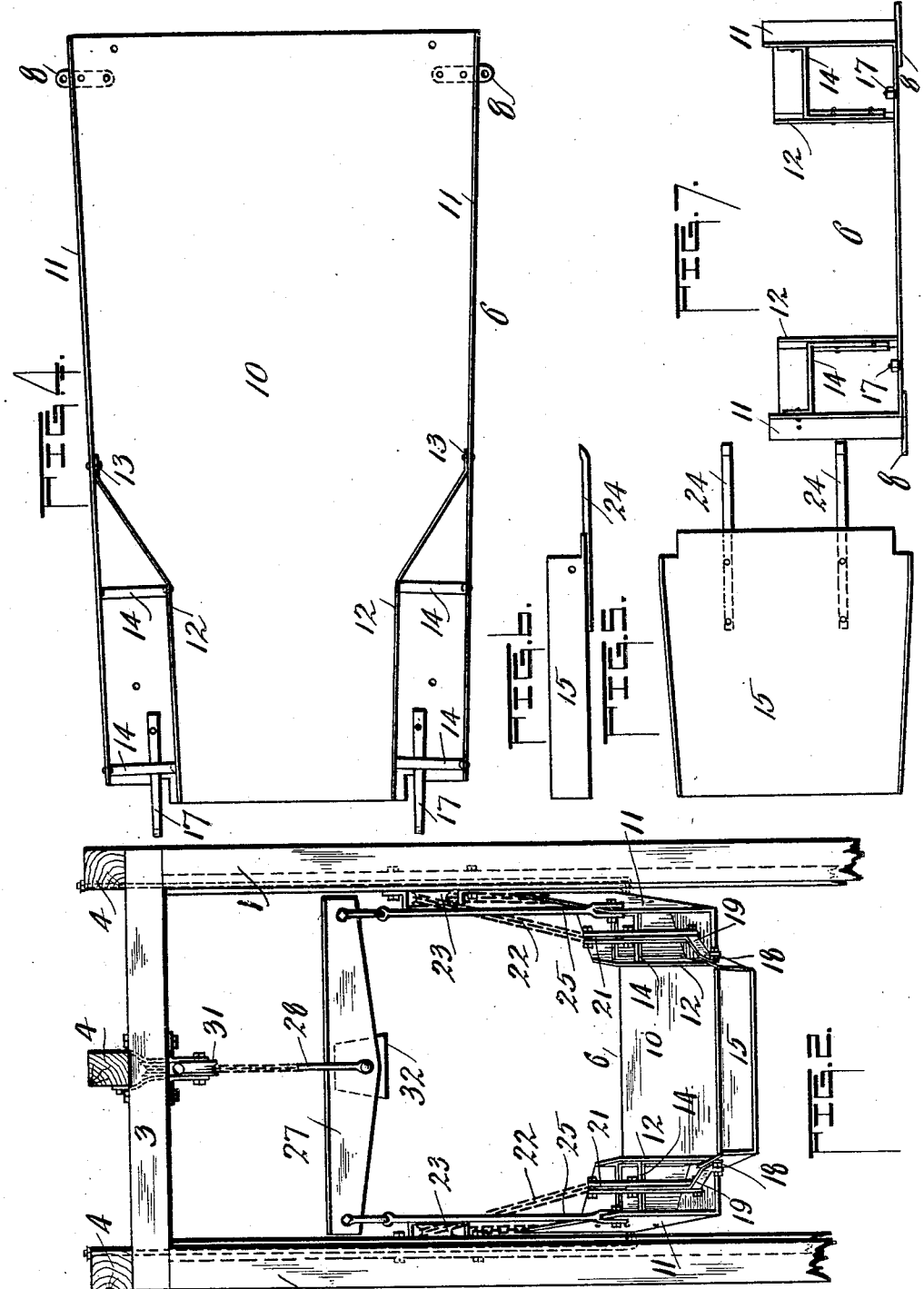

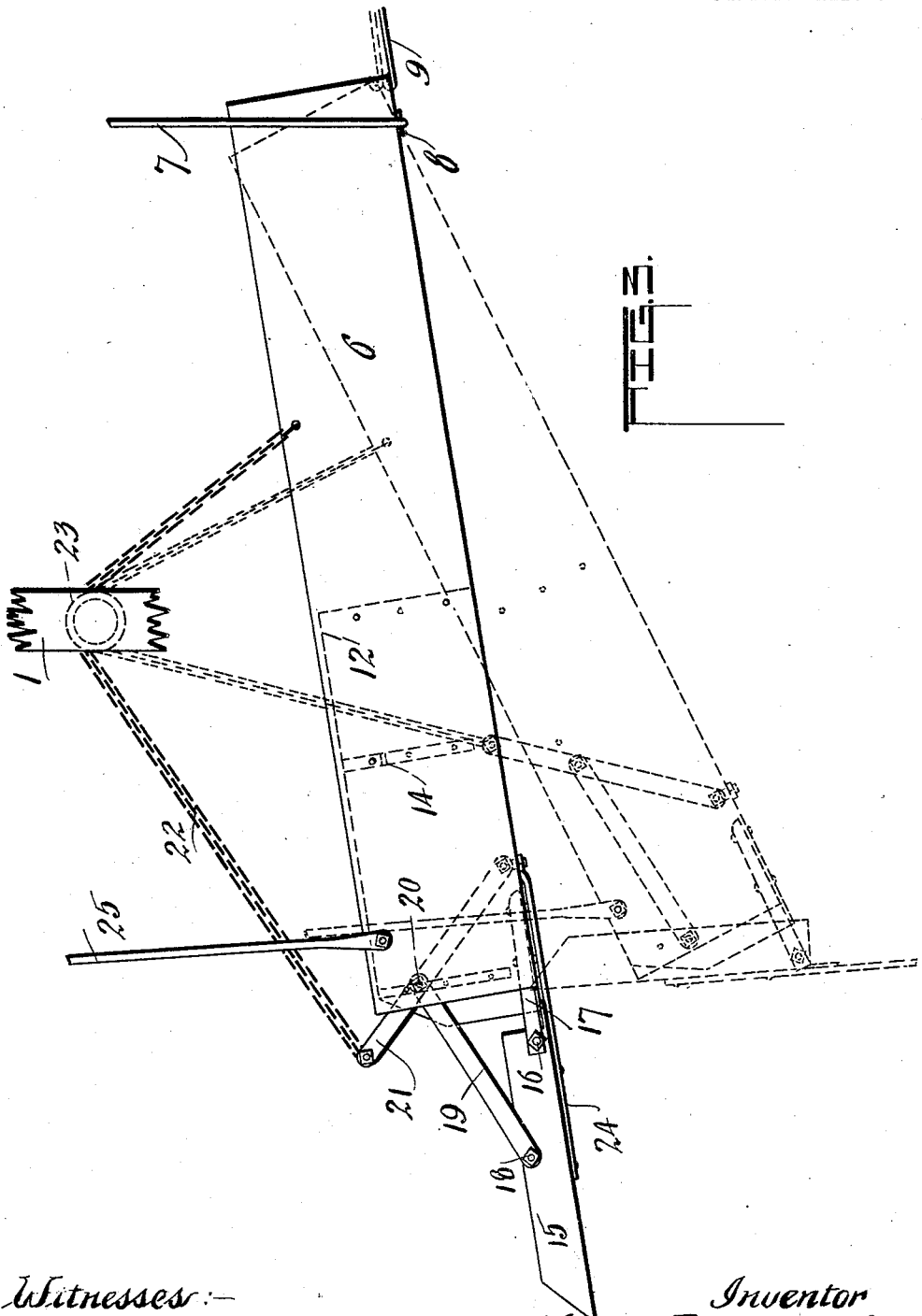

UNITED STATES PATENT OFFICE.

THOMAS NEWSAM, JR., OF FARMINGTON, ILLINOIS.

CAR-LOADING DEVICE.

No. 898,594.

Specification of Letters Patent.

Patented Sept. 15, 1908.

Application filed December 17, 1906. Serial No. 348,158.

*To all whom it may concern:*

Be it known that I, THOMAS NEWSAM, Jr., a citizen of the United States, residing at Farmington, in the county of Peoria and State of Illinois, have invented certain new and useful Improvements in Car-Loading Devices; and I do hereby declare that the following is a full, clear, and exact description of the invention, which will enable others skilled in the art to which it appertains to make and use the same.

This invention has reference to certain new and useful improvements in devices for loading cars, the invention being designed more particularly for use in connection with a coal-dump at coal-mines, and other similar places.

One of the objects of the present invention is a pan and an apron pivotally connected thereto, said apron being controlled in the rise and fall of said pan by means of a connection between operative parts of said apron and said pan, and to means for raising and lowering the pan.

A further object of the invention is in the connection between a pan and an apron pivotally connected thereto, whereby when said pan is raised the apron is lowered, and when the pan is lowered the apron is raised; the relative positions of the pan and apron and their connections being such that when the pan is raised for the purpose of loading a box car, the apron will fall and enter the car-door opening, regardless of the capacity of said car.

The invention has for its further object, a pan to which an apron is pivotally connected by means of suitable levers, said pan having supplemental inner walls forming a contracted opening for the path of coal as it leaves the pan and to protect said levers; means for raising and lowering said pan; weighted connections in said raising and lowering means, and connections between levers and said pan.

For a further and full description of the invention herein and the merits thereof, and also to acquire a knowledge of the details of construction, of the means for effecting the result, reference is had to the following description and drawings hereto attached.

While the essential and characteristic features of the invention are susceptible of modification, still the preferred embodiment of the invention is illustrated in the accompanying drawings, in which:—

Figure 1 is a side elevation of a portion of a suitable frame work forming a support for the working parts of my invention and showing the manner of mounting the same;
Fig. 2 is a front elevation of what is seen in Fig. 1, with the exception that the power means for raising and lowering the pan is omitted; Fig. 3 is a side elevation of the pan and apron connected thereto; full lines illustrating the working position of the parts and dotted lines showing the closed position of same; Fig. 4 is a plan view of pan with apron detached; Fig. 5 is a plan view of the apron; Fig. 6 is a side elevation of Fig. 5, and Fig. 7 is a front elevation of the pan shown in Fig. 4.

In Fig. 1 the arrangement and position of the various parts of the apparatus show it to be between a coal-dump, at the right, (not shown) and a shovel-house, at the left, (not shown), and while no track is disclosed, the same would be located, so that a car would pass between the shovel-house and forward end of the apron and pan, whereby, when the pan has assumed the position seen in Fig. 1, the apron would project into a car-door opening.

One of the disadvantages in car-loading-devices where they have used an apron to be projected through a car-door opening has been in the connection between the apron and pan; such connections having been of such a character that should cars of varying capacity be placed before the pan, in only a few of such cases could the apron be placed, for the reason, that cars of varying capacity have varying heights of doors, and where the connections between pan and apron extended forward to the front end of the apron, the apron could not pass through the car door opening; also, the construction and arrangement of pan and apron were such that no adjustment could be effected to vary the movement of the apron when the pan was raised and lowered, which makes it possible, by the presence of such means in my device, to adapt it to all of the conditions referred to above.

A frame work consisting of suitable uprights 1 and 2 and braces 3 and 4 form the main support for the working parts of my apparatus. Such support being the skeleton of a suitable frame work in connection with a suitable coal-dump and shovel-house; although the invention may be applied in any other suitable manner and for other and various purposes.

A pan is indicated as 6 and is suspended at its rear end by means of rods 7 connected at their upper end in braces 4 and their lower ends with clips 8 secured to the lower face of the bottom of said pan; stay rods 9 are also employed connected at the forward ends with the bottom of the pan and at their opposite ends with a suitable support, not shown. The working position of the pan is substantially that shown in Fig. 1, while the closed position is substantially that shown in dotted lines, in Fig. 3. The plan of the pan is best seen in Fig. 4, and for convenience the bottom of the pan is denoted as 10, and the sides thereof as 11.

12 indicates supplemental walls, which are approximately the same height as the side walls 11 and are connected thereto at 13, from which point the walls 12 extend diagonally forwardly a suitable distance and then parallel with walls 11, but spaced apart therefrom; the walls 12 terminating at the forward edge of the bottom 10 of the pan, see Fig. 4. The parallel portions of walls 10 and 12 being braced as at 14. The object of the walls 12 is two-fold; first, to form a contracted mouth or spout for the forward portions of the pan to guide the coal into the apron, to be described, connected to the pan, and also, to protect the connections between the pan and apron, which will be more fully described.

The apron is referred to as 15, substantially the shape shown in the figures and being pivotally connected at 16 to the forward ends of bars 17 which are secured at their opposite ends to the bottom of the pan and between the main and supplemental walls, thereof, as indicated. To the apron and particularly the side walls thereof, as at 18, are pivotally connected reach-bars 19, which have their opposite ends pivotally connected at 20, with levers 21, pivotally connected at their lower ends to the walls 10 of said pan. And to the upper ends of the levers 21 are preferably connected suitable link-chains 22, which pass up and over sheave-wheels 23 suitably supported or journaled to the uprights 1 and have their inner or opposite ends connected to the sides of the pan. To vary the movement of the apron, through the connections just described, one or more links from the chain may be detached or others added, and thus the movement of the apron as well as pan will be materially affected.

To insure the apron assuming a position when lowered, to bring the bottom thereof in line with the bottom of the pan, stop members 24 are secured to the lower face of the apron bottom and projecting beyond the inner edge of said bottom, they will, as shown in Fig. 1, engage with the lower face of the bottom of the pan when the apron is lowered.

To the forward ends of the walls 10 of the pan are connected rods 25, which extend up a suitable distance and are coupled with links 26, attached to opposite ends of a lever or reach 27, which centrally thereof has connected therewith a link 28 to which the ends of two chains, 29 and 30 are connected. The chain 29 extends up and passes over sheave wheels 31 supported by one of the braces 4 and the opposite end supports a weight 32. The chain 30 passes up over a sheave wheel 33 supported by the brace 3 and is then connected with an equalizer 34 from which a cable 35 extends which is adapted to be wound on a drum 36 mounted on a suitable support 27; said drum adapted to be rotated by a crank 38 and governed by a ratchet and pawl as shown. Being one form of windlass which I prefer to use to raise and lower the pan.

Having thus fully described my invention, what I claim and desire to secure by Letters Patent of the United States, is:

1. In an apparatus of the class described, the combination of a pan, supplemental inner walls for the forward portion of said pan to produce a contracted mouth therefor, an apron, and means projecting from between outer and supplemental walls of said pan, to which said apron is pivoted.

2. In an apparatus of the class described, the combination of a pan, supplemental walls secured to the side walls of the pan and extending diagonally forwardly have portions parallel with and spaced apart from the walls of said pan, an apron, and means projecting from between outer and supplemental walls of said pan to which said apron is pivoted, said apron at its inner end adapted to engage with the bottom of the forward end of the pan.

3. In an apparatus of the class described, the combination of a pan, supplemental inner walls for the forward portion of said pan to produce a contracted mouth therefor, arms extending forwardly from said pan and secured to the bottom thereof, intermediate the outer and supplemental wall thereof, and an apron pivotally connected with the outer ends of said arms.

4. In an apparatus of the class described, the combination of a pan, supplemental inner walls for the forward portion of said pan to produce a contracted mouth therefor, arms extending forwardly from said pan and disposed between the outside and supplemental walls thereof, and an apron pivotally connected with said arms.

5. In an apparatus of the class described, the combination of a pan, supplemental inner walls for the forward portion of said pan to produce a contracted mouth therefor, arms extending forwardly from said pan, an apron pivotally connected to said arm, levers pivoted to the pan, connections between levers and aprons, and connections between the outer ends of levers and outside walls of said pan.

6. In an apparatus of the class described, the combination of a pan, supplemental inner walls for the forward portion of said pan to produce a contracted mouth therefor, arms extending forwardly from said pan and disposed between the outside and supplemental walls thereof, an apron pivotally connected to said arms, levers pivotally connected to said pan and operating between the outside and supplemental walls thereof, connections between levers and apron, and connections between outer ends of levers and outside walls of said pan.

7. In an apparatus of the class described, the combination of a pan, supplemental inner walls for the forward portion of said pan to produce a contracted mouth therefor, arms extending forwardly from said pan, an apron pivotally connected to said arm, levers pivoted to the pan, connections between levers and apron, chains connected with outer ends of said levers and outside walls of said pan, and guiding sheave wheels for said chains.

8. In an apparatus of the class described, the combination of a pan suspended from a fixed support, at one end, mechanism for raising and lowering the opposite end of said pan, weighted connections in said raising and lowering mechanism, an apron swingably attached to said pan, and lever connections between the walls of pan and apron.

9. In an apparatus of the class described, the combination of a pan suitably supported at one end, a lever, connections between forward end of pan and said lever, mechanism for raising and lowering said lever, weighted connections with said lever, an apron swingably attached to said pan, and lever connections between the walls of pan and apron.

10. In an apparatus of the class described, the combination of a pan, arms attached to and projecting from said pan, an apron pivotally connected to said arms, means attached to said apron adapted to engage with the bottom of pan to limit the fall of the apron when lowered, lever connections between the wall of pan and apron, chains attached at one end to said levers and their opposite ends to said pan, and mechanism for sustaining the position of the forward end of pan and also adapted to raise and lower the same.

11. In an apparatus of the class described, the combination of a pan, arms attached to and projecting from said pan, an apron pivotally connected to said arms, a pair of rods attached to said apron adapted to engage with the bottom of the pan to limit the fall of the apron when lowered, lever connections between walls of pan and apron, chains connected to levers, and to the walls of the pan, guiding sheave wheels for said chains, a windlass, and connections between the windlass and said pan.

12. In an apparatus of the character described, the combination with a frame composed of suitable uprights and braces, a pan suitably suspended at one end from said support, an apron pivotally attached to said pan, lever connections between pan and apron, chains connected at one end with said levers and the opposite end with the walls of said pan, guiding sheave wheels for said chains, a power device, a chain operated by said power device and connected with said pan, and guiding sheave wheels for said last mentioned chain.

13. In an apparatus of the class described, the combination of a pan, means for suspending said pan at one end, from a suitable support, levers pivotally connected at their inner ends to the forward ends of said pan, chains connected at one end to the free ends of said levers and the opposite ends to the body of the pan, guides for said chains, an apron, means for pivotally connecting the inner end of the apron to the pan, and connections between the body of the apron and with the body of said levers.

14. In an apparatus of the class described, the combination of a pan, means for suspending said pan at one end, from a suitable support, levers pivotally connected at their inner ends to the forward ends of said pan, chains connected at one end to the free end of said levers and the opposite ends to the body of the pan, guides for said chains, an apron, means for pivotally connecting the inner end of the apron to the pan, and connections between the body of the apron and the levers intermediate their ends, and raising and lowering means connected with the forward end of said pan.

15. In an apparatus of the class described, the combination of a pan, means for suspending said pan at one end, from a suitable support, levers pivotally connected at their inner ends to the forward ends of said pan, chains connected at one end to the free ends of said levers and the opposite ends to the body of the pan, guides for said chains, arms projecting forwardly from the body of the pan, an apron having a pivotal connection at its inner end with said arms, connections between the body of the apron and the levers intermediate their ends, and raising and lowering means connected with the forward end of the pan.

16. In an apparatus of the class described, the combination with a suitable frame-work of a pan suspended at one end in a suitable manner in said frame-work, levers pivotally connected with the forward end of the pan, chains connected with the levers and with the body of the pan, guides for said chains supported by the frame-work, an apron having a pivotal connection at its inner end with the forward end of the pan, bars connected with the body of the apron and with the levers intermediate their ends, a windlass, connections between the windlass and the forward end of the pan, a chain connected with the connections between the pan and the windlass, and a weight attached to said last mentioned chain.

In testimony whereof I affix my signature, in presence of two witnesses.

THOMAS NEWSAM, JR.

Witnesses:
    CHAS. N. LA PORTE,
    J. M. ANDERSON.